US010821772B2

(12) United States Patent
Prasannavenkatesan et al.

(10) Patent No.: US 10,821,772 B2
(45) Date of Patent: Nov. 3, 2020

(54) PERSONALIZED SUBSTRATES

(71) Applicant: Facebook, Inc., Menlo Park, CA (US)

(72) Inventors: Rajesh Prasannavenkatesan, Menlo Park, CA (US); Richard Heley, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 288 days.

(21) Appl. No.: 16/044,338

(22) Filed: Jul. 24, 2018

(65) Prior Publication Data

US 2020/0031162 A1 Jan. 30, 2020

(51) Int. Cl.

*B23K 26/00* (2014.01)
*B44C 1/22* (2006.01)
*B05D 3/06* (2006.01)

(52) U.S. Cl.

CPC .............. *B44C 1/228* (2013.01); *B05D 3/068* (2013.01)

(58) Field of Classification Search

CPC ........ G06F 3/12; G06F 3/1203; G06F 3/1204; G06F 3/1206; G06F 3/1238; G06F 3/1247; G06F 3/1255; G06F 3/1285; G06F 3/1298; B44C 1/228; B05D 3/068; B41M 5/00; B41M 5/24; B41M 5/267

USPC .............. 219/121.6, 121.65, 121.66, 121.67, 219/121.68, 121.69

See application file for complete search history.

(56) References Cited

U.S. PATENT DOCUMENTS

| | | | | |
|---|---|---|---|---|
| 9,282,138 | B2 * | 3/2016 | Grewal | H04L 67/306 |
| 2007/0274559 | A1 | 11/2007 | Depta | |
| 2010/0258636 | A1 | 10/2010 | Theodossiou | |
| 2017/0124586 | A1 | 5/2017 | Tepper | |
| 2017/0154249 | A1 * | 6/2017 | Mach | G06K 15/1809 |
| 2017/0187664 | A1 * | 6/2017 | Lilot | H04L 12/185 |
| 2018/0004861 | A1 | 1/2018 | Lessin | |
| 2018/0130108 | A1 * | 5/2018 | Wu | G06T 7/60 |
| 2018/0186167 | A1 * | 7/2018 | Jones | B42D 25/23 |
| 2018/0285045 | A1 * | 10/2018 | Biehlmann | G06F 3/1204 |
| 2019/0147206 | A1 * | 5/2019 | Nakata | G11B 7/0065 235/451 |

FOREIGN PATENT DOCUMENTS

| | | |
|---|---|---|
| KR | 101485798 | 1/2015 |

OTHER PUBLICATIONS

International Search Report and Written Opinion for International Application No. PCT/US2018/043646, dated Jul. 25, 2018.

* cited by examiner

*Primary Examiner* — Hung D Nguyen
(74) *Attorney, Agent, or Firm* — Baker Botts L.L.P.

(57) ABSTRACT

In one embodiment, a method includes determining an ornamental pattern to be transferred to a substrate. The ornamental pattern is specific to a particular user, and one or more parameters of the ornamental pattern are based at least in part on social-graph information of the user. The method also includes generating one or more instructions for controlling a laser-treatment system to transfer the ornamental pattern to the substrate; sending the instructions to the laser-treatment system to transfer the ornamental pattern to the substrate; and transferring the ornamental pattern to the substrate.

20 Claims, 14 Drawing Sheets

400

PERSONALIZED SUBSTRATES

TECHNICAL FIELD

This disclosure generally relates to transferring an ornamental design to a substrate.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

SUMMARY OF PARTICULAR EMBODIMENTS

Particular embodiments describe a programmable, scalable manufacturing process to produce a surface with visible, randomized pattern that is unique for each user. As example and not by way of limitation, a personalized ornamental pattern produced on a surface of a base substrate for a device may be a pseudo-random pattern generated using profile information of the user as a basis for the pattern. The personal information of the user may be directly entered by the user for this purpose, directly approved by the user for this purpose, or a privacy setting was opted into where this manufacturing process can access this type of information. An example may be a pseudo-random pattern that is generated using a seed number obtained using social-graph information of the user (e.g., user interests or number of friends).

The ornamental pattern may be introduced through use of a guided laser beam. The portions of the surface exposed to the laser beam may be modified using an additive (e.g., anodization or cladding of another material) or removal (e.g., chemical etching) process that causes localized depth variations on the surface of the base substrate. In particular embodiments, the base substrate may be coated or cladded to create a contrast that is visible to the human eye. The components of the ornamental pattern may be cross-hatches or speckles.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a method for in-line, large-scale manufacturing that produces a personalized ornamental pattern on a surface of a base substrate. Personalization herein refers to a pattern that is unique to a particular person or user, but the pattern is not necessarily generated by the user. As example and not by way of limitation, a personalized pattern produced on the surface of the base substrate may be a pseudo-random pattern generated using social-graph information, described below, of the user as a basis for one or parameters of the pattern. As described below, the surface pattern may be a pseudo-random pattern that is generated using a seed number obtained using social-graph information of the user (e.g., user content objects or number of friends). The social-graph information of the user may be directly entered by the user for this purpose, directly approved by the user for this purpose, or a privacy setting was opted into where this manufacturing process can access this type of information.

The ornamental pattern may be introduced through use of a guided laser beam. In particular embodiments, the surface of the base substrate may be roughened and coated with an organic coating (e.g., a photoresist). The portions of the surface exposed to the laser beam may be modified using an additive (e.g., anodization or cladding of another material) or removal (e.g., chemical etching) process that leads to the pattern being visible on the surface of the base substrate. Although this disclosure illustrates and describes producing personalized ornamental patterns on particular surfaces, this disclosure contemplates producing any suitable personalized ornamental pattern on the any suitable surface, such as for example cross-hatched or speckled pattern.

Figure 1B:
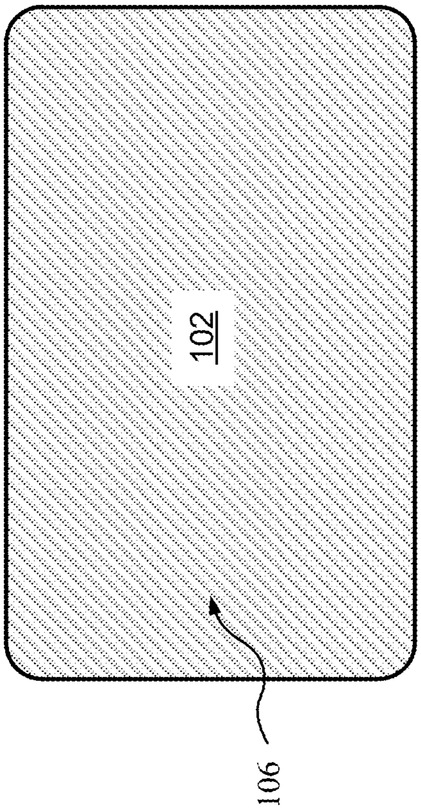
FIGS. 1A-1D illustrate an example laser ablation process.
Figure 1A:
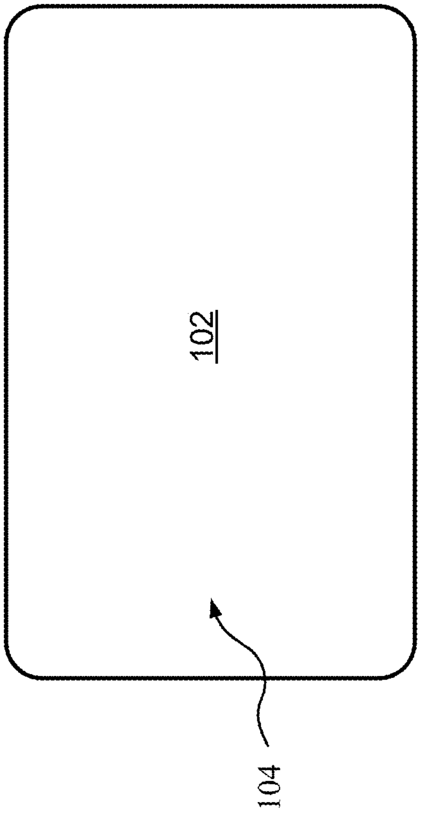

FIGS. 1A-1D illustrate an example laser ablation process. The laser ablation process of the substrate is an in-line, large-scale manufacturing that produces a personalized pattern on a surface 104 of a base substrate 102. Base substrate 102 illustrated in the example of FIG. 1A may be aluminum, titanium, zinc, magnesium, niobium, zirconium, hafnium, or tantalum. Surface 104 of base substrate 102 may be exposed to a surface abrasion process resulting in a roughened surface 106 of base substrate 102, as illustrated in the example of FIG. 1B. In particular embodiments, an inert material such as for example sand may be used to create roughened surface 106. Areas of roughened surface 106 may be ablated or etched with a laser, thereby removing portions of roughened surface 106 to form micro-features 108. As an example and not by way of limitation, the laser may be part of a laser-treatment system.

In particular embodiments, the laser-treatment system may perform laser etching, laser ablation, laser lithography, or any suitable laser-transfer process. As an example and not by way of limitation, the laser-treatment system may include the laser, a structure to hold the laser, and a structure to hold the substrate. The laser-treatment system may further include a mirror system or beam-splitter to move the beam of the laser across a surface of the substrate. In particular embodiments, the structure holding the laser may be stationary, while the structure holding the substrate may be moveable. In other particular embodiments, the structure holding the laser may be moveable, while the structure holding the substrate may be stationary. Although this disclosure describes a laser-treatment system having particular components, this disclosure contemplates a laser-treatment system having any suitable components.

Figure 1D:
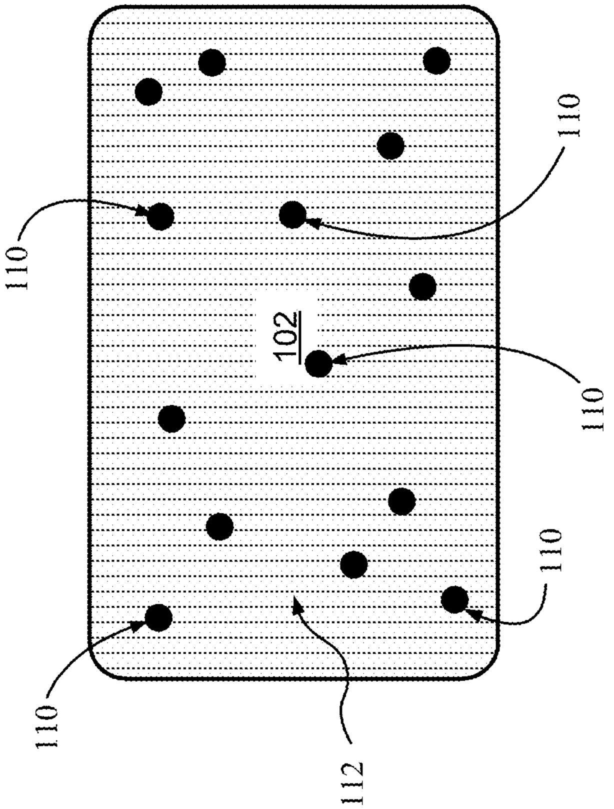
Figure 1C:
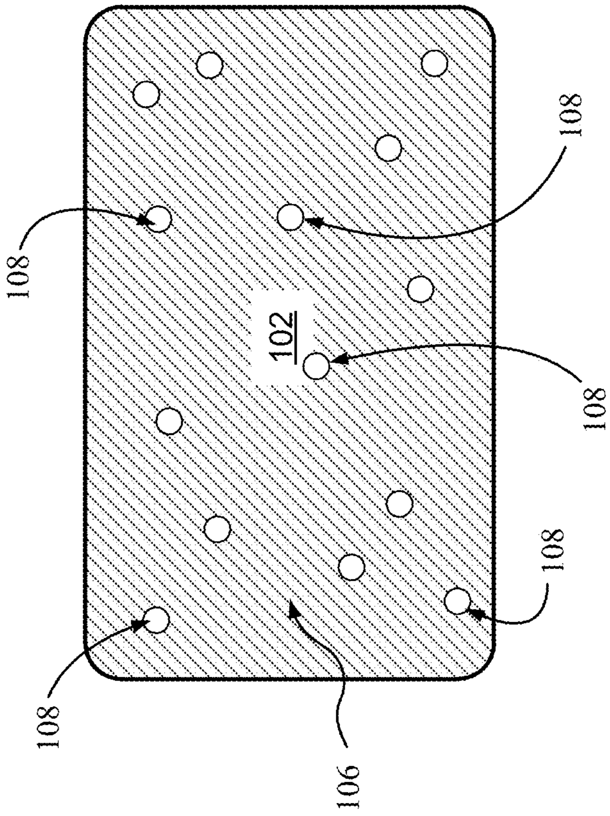

As illustrated in the example of FIG. 1C, micro-features 108 may be a circular dot that forms a speckle pattern on roughened surface 106. The shape (e.g., dots, lines, or square) of the micro-feature 108 may constitute in whole or in part one or more patterns (e.g., speckle or cross-hatch) on a surface (e.g., 106) of base substrate 102, and one or more micro-features 108 may determine one or more optical features of surface 106. Roughened surface 106 may undergo a passivation process to produce a passivated surface 112. As illustrated in the example of FIG. 1D, passivated surface 112 may include micro-features 110 with the passivation material. In particular embodiments, passivated surface 112 may be produced through anodization of roughened surface 106. Anodization is an electrolytic passivation process that increases the thickness of a natural oxide layer on roughened surface 106. Anodization changes the microscopic texture of roughened surface 106 and the crystal structure of the metal near roughened surface 106, thereby increasing the natural oxide and accentuating micro-features 110. As an example and not by way of limitation, after anodization, micro-features 110 may be circular resulting in a speckle pattern on passivated surface 112.

In particular embodiments, a metal cladding processing step may be used to introduce different texture to the pattern on base substrate 102. Cladding is the bonding of dissimilar metals (e.g., steel and copper or different chemistries of aluminum alloy on an aluminum substrate), which may create a contrast perceptible to the human eye. In particular embodiments, laser cladding may be used to bond the dissimilar metal to passivated surface 112. As an example and not by way of limitation, a metal-based powder may be applied to roughened surface 106 and the interaction of the metal-based powder with the laser of a laser-treatment system causes the bonding of the metal in the powder to the portions of roughened surface 112 exposed to the laser to occur. In particular embodiments, the laser beam may be guided over base substrate 102 to produce micro-features 108 with cladded metal. In particular embodiments, the motion of the laser over base substrate 102 for laser ablation or metal cladding may be guided by a computing system.

Figure 2A:
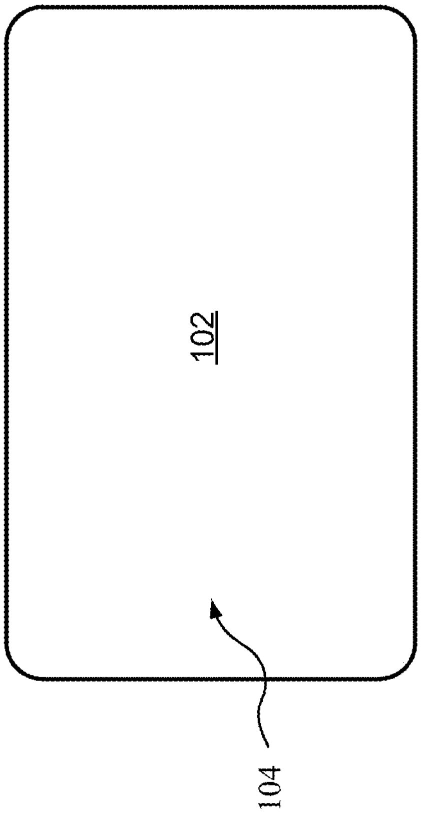
FIGS. 2A-2G illustrate an example laser ablation process using an organic polymer.
Figure 2B:
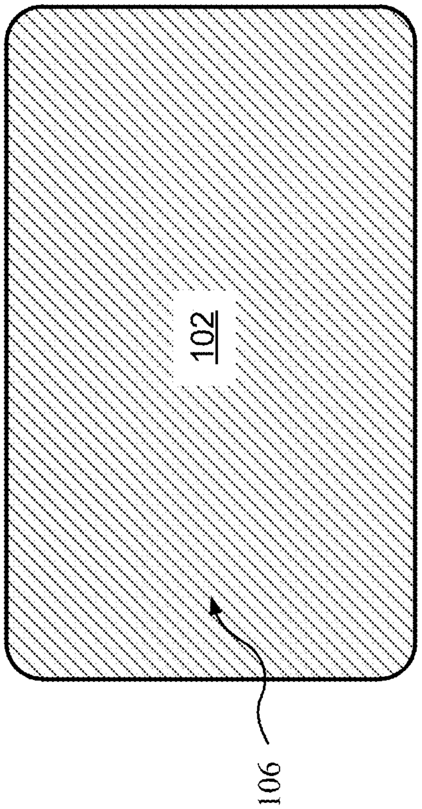
Figure 2D:
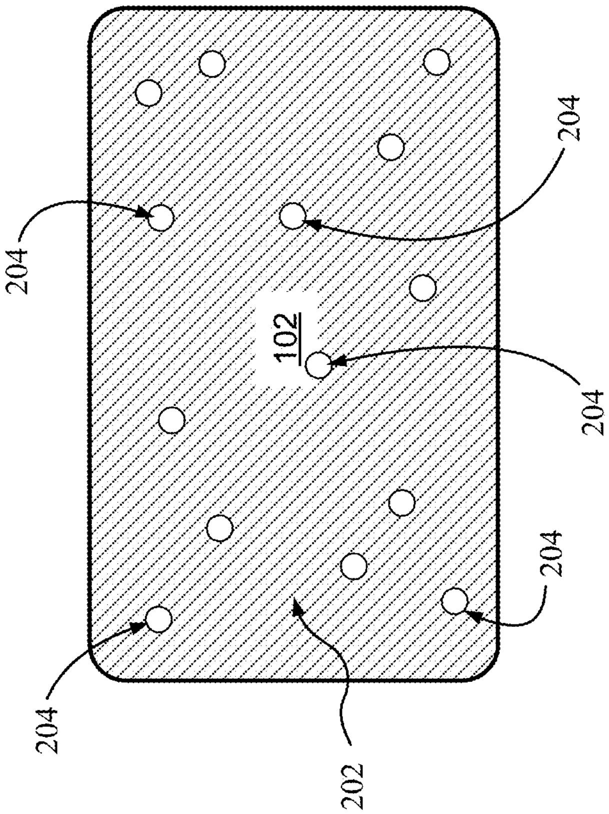
Figure 2C:
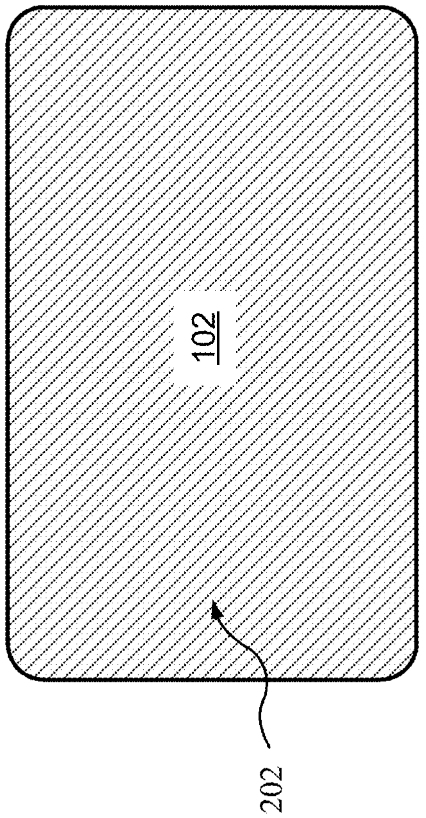

FIGS. 2A-2G illustrate an example laser ablation process using an organic polymer. Base substrate 102 illustrated in the example of FIG. 2A may be aluminum, titanium, zinc, magnesium, niobium, zirconium, hafnium, or tantalum. As described above, surface 104 of base substrate 102 may be exposed to a surface abrasion process resulting in a roughened surface 106 of base substrate 102, as illustrated in the example of FIG. 2B. In particular embodiments, roughened surface 106 may be coated with an organic polymer, resulting in a coated surface 202, as illustrated in the example of FIG. 2C. The roughness of surface 106 may serve to increase adhesion of the organic polymer to base substrate 102. In particular embodiments, the organic material may be a light-sensitive organic material (e.g., photoresist). The organic material may be chosen such that the organic material is sensitive to the wavelength of a laser, and reacts (e.g., polymerizing or dissolving) when exposed to the laser.

Figure 2F:
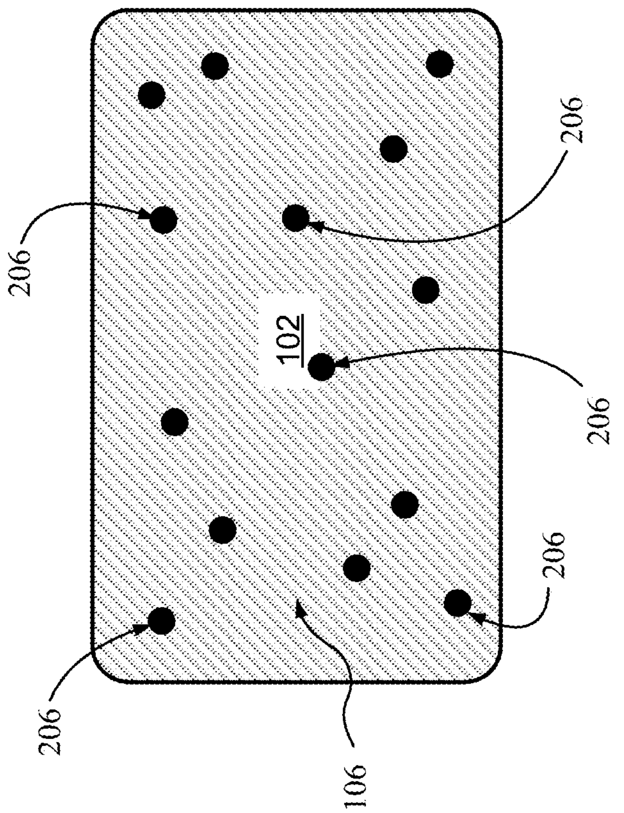
Figure 2E:
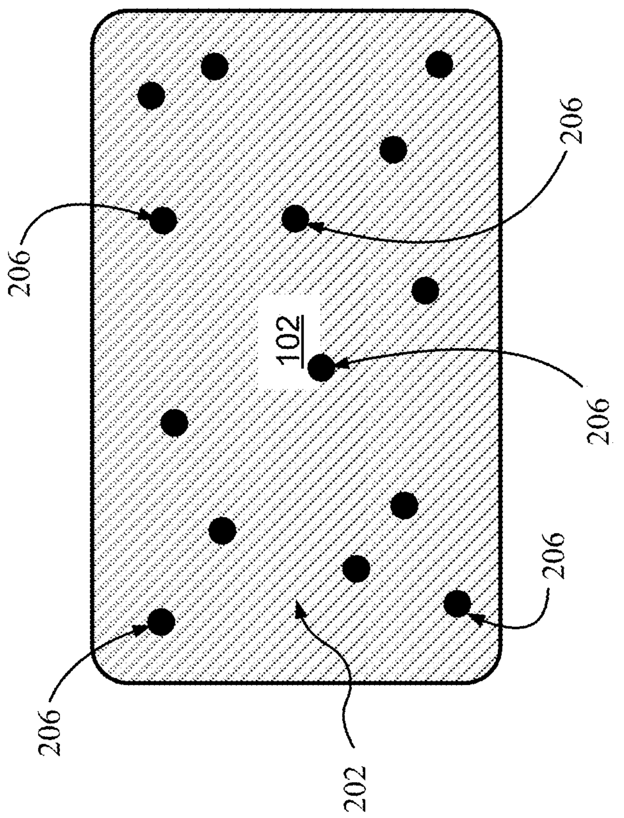
Figure 2G:
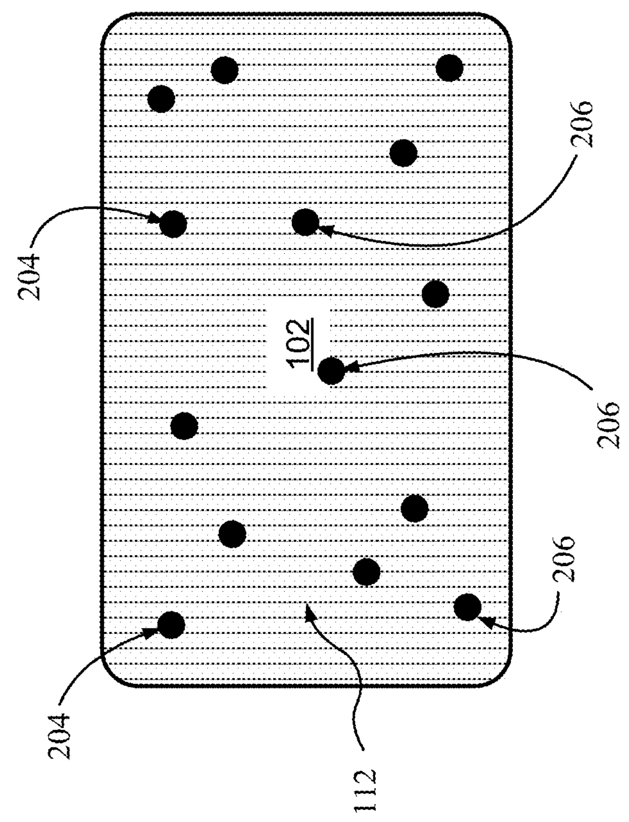

In particular embodiments, areas of coated surface 202 may be ablated or etched with a laser, thereby removing portions of the organic polymer on coated surface 202 to form openings 204, as illustrated in the example of FIG. 2D. As an example and not by way of limitation, the laser may be part of a laser-treatment system. Coated surface 202 may undergo an etching step that etches and removes portions of roughened surface 106 exposed by openings 204, resulting in etched micro-features 206, as illustrated in the example of FIG. 2E. In particular embodiments, etching micro-features 206 may be performed using a chemical etching process. After the etching step described above, the organic material may be removed from coated surface 202, resulting in roughened surface 106 with etched micro-features 206, as illustrated in the example of FIG. 2F. The shape of etched micro-features 206 may include dots, lines, or squares. As described above, roughened surface 106 may undergo a passivation process to produce a passivated surface 112. As illustrated in the example of FIG. 2G, passivated surface 112 may include micro-features 206 with the passivation material produced through anodization of roughened surface 106. As an example and not by way of limitation, after anodization, micro-micro-features 110 may be circular resulting in a speckle pattern on passivated surface 112.

Figure 3B:
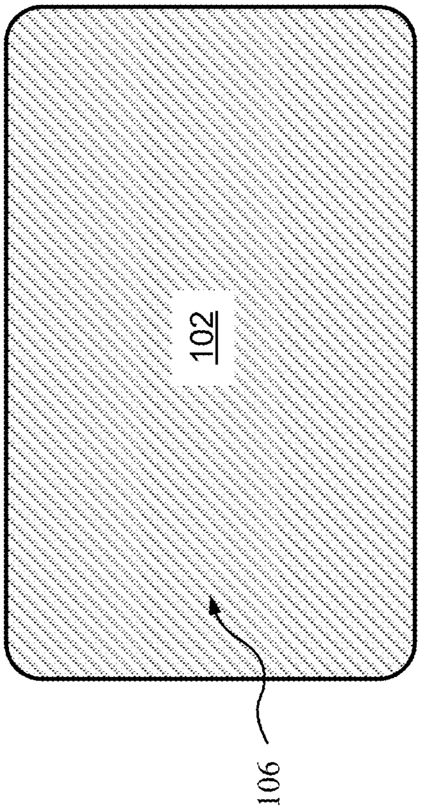
FIGS. 3A-3D illustrate an example laser exposure process with a dyed anodized surface.
Figure 3A:
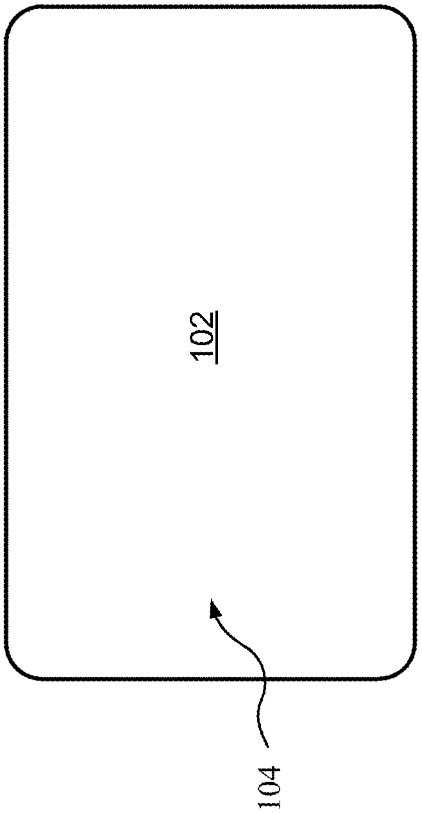
Figure 3D:
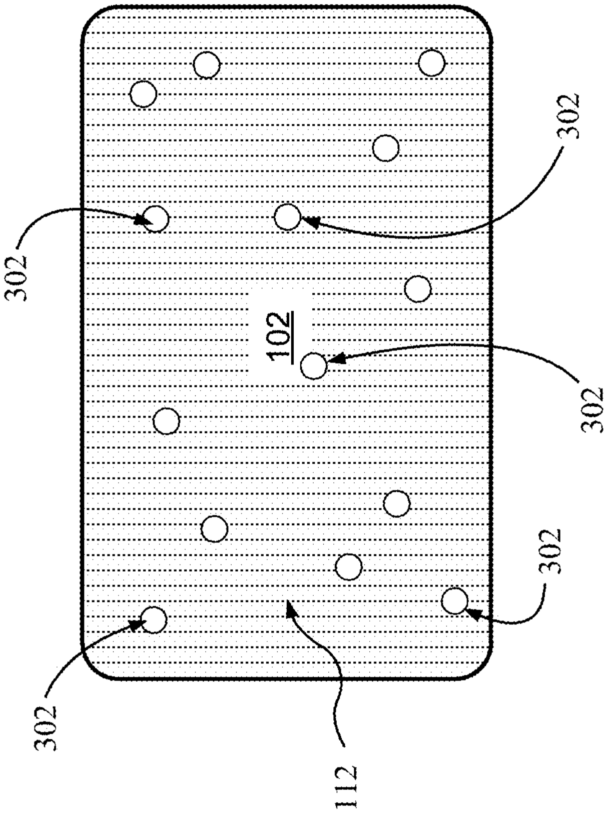
Figure 3C:
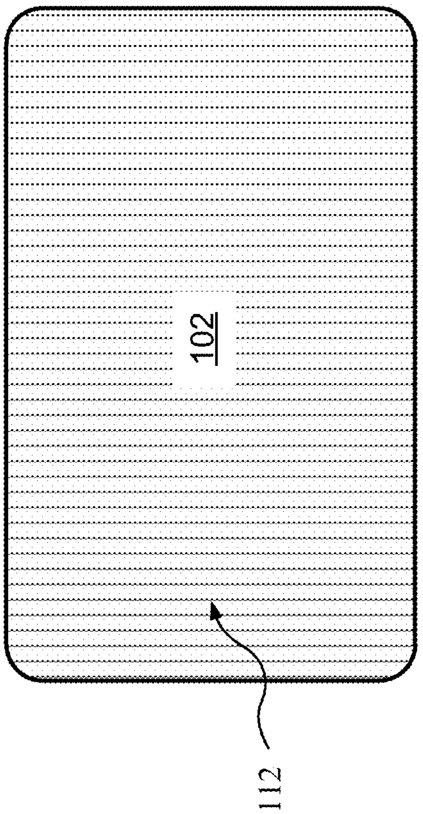

FIGS. 3A-3D illustrate an example laser exposure process with a dyed anodized surface. Base substrate 102 illustrated in the example of FIG. 3A may be aluminum, zinc, magnesium, niobium, zirconium, hafnium, titanium, or tantalum, as described above. Surface 104 of base substrate 102 may be exposed to a surface abrasion process resulting in a roughened surface 106 of base substrate 102, as illustrated in the example of FIG. 3B. In particular embodiments, an inert material such as for example sand may be used to create roughened surface 106. In particular embodiments, the surface-abrasion process that produces roughened surface 106 may also create a porous surface that may accept dyes relatively easily. As described above, roughened surface 106 may undergo a passivation process to produce a passivated surface 112. In particular embodiments, the passivated surface may be dyed to produce passivated surface 112, as illustrated in the example of FIG. 3C. The colors produced tend to vary according to the base alloy. In particular embodiments, the dyeing process may include immersing anodized surface 112 in a liquid solution that contains dissolved dye. Passivated surface 112 absorbs the dye from the liquid solution and the intensity of color may be related to the thickness of the natural oxide, the dye concentration, immersion time, or temperature. In particular embodiments, portions of color passivated surface 112 may be exposed with a laser degrading the dye in the exposed areas. As an example and not by way of limitation, the laser may degrade the dye in the exposed area by decreasing the concentration of dye molecules in those areas. As described above, the laser may be part of a laser-treatment system. The degraded portions of color passivated surface 112 may form micro-features 302, as illustrated in the example of FIG. 3D. Micro-features 302 may be roughly circular, depending on the laser beam profile, and forming a speckle pattern on color passivated surface 112. Although this disclosure illustrates and describes processes to generate particular micro-features for particular ornamental patterns, this disclosure contemplates any suitable processes, such as for example, non-passivation processes including vapor deposition (e.g., chemical vapor deposition) or two-tone paint deposition, for generating any suitable ornamental pattern.

Figure 4:
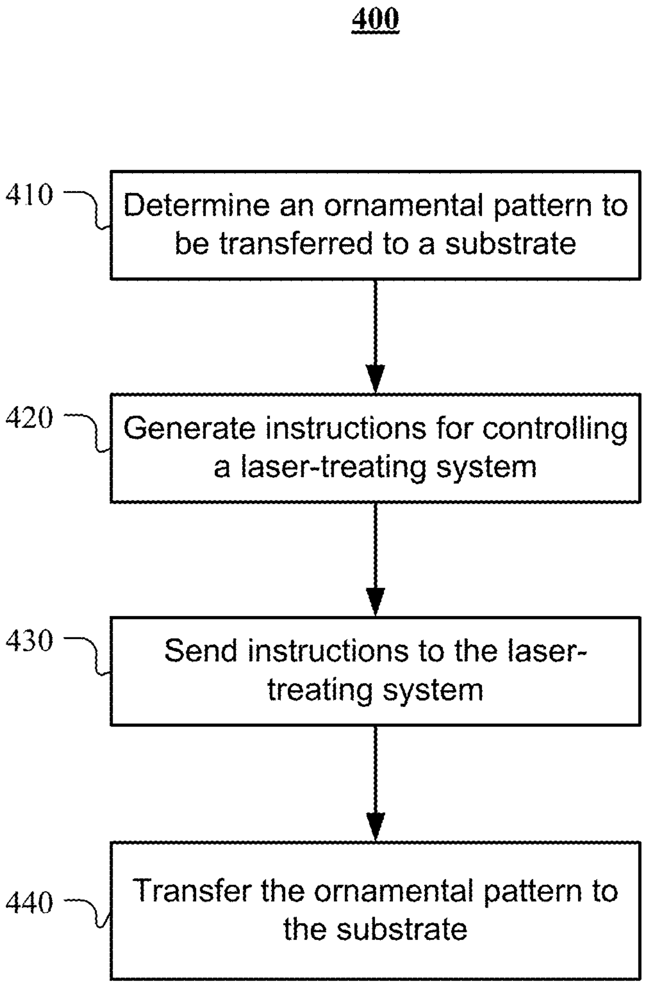
FIG. 4 illustrates an example method for transferring an ornamental pattern on to a substrate.

FIG. 4 illustrates an example method for transferring an ornamental pattern on to a substrate. The method 400 may begin at step 410, where a computing device determines an ornamental pattern to be transferred to a substrate. In particular embodiments, the ornamental pattern is personalized and specific to a particular user. As described above, one or more parameters of the ornamental pattern may be based at least in part on social-graph information of the user. The social-graph information of the user may be directly entered by the user for this purpose, directly approved by the user for this purpose, or a privacy setting was opted into where this manufacturing process can access this type of information. As an example and not by way of limitation, the ornamental pattern may be a pseudo-random pattern that is generated using a seed number that is a based on a user's newsfeed items or number of friends. At step 420, a computing device generates one or more instructions for controlling a laser-treatment system to transfer the ornamental pattern to the substrate. In particular embodiments, the instructions direct a laser of the laser-treatment system to expose particular areas of the surface of the substrate that is coated with an organic polymer. At step 430, a computing device sends the instructions to the laser-treatment system to transfer the ornamental pattern to the substrate. At step 440, the laser-treatment system transfers the ornamental pattern to the substrate. In particular embodiments, the areas of the organic polymer that is exposed by the laser may correspond to micro-features of the ornamental pattern. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for transferring an ornamental pattern on to a substrate including the particular steps of the method of FIG. 4, this disclosure contemplates any suitable method for transferring an ornamental pattern on to a substrate including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
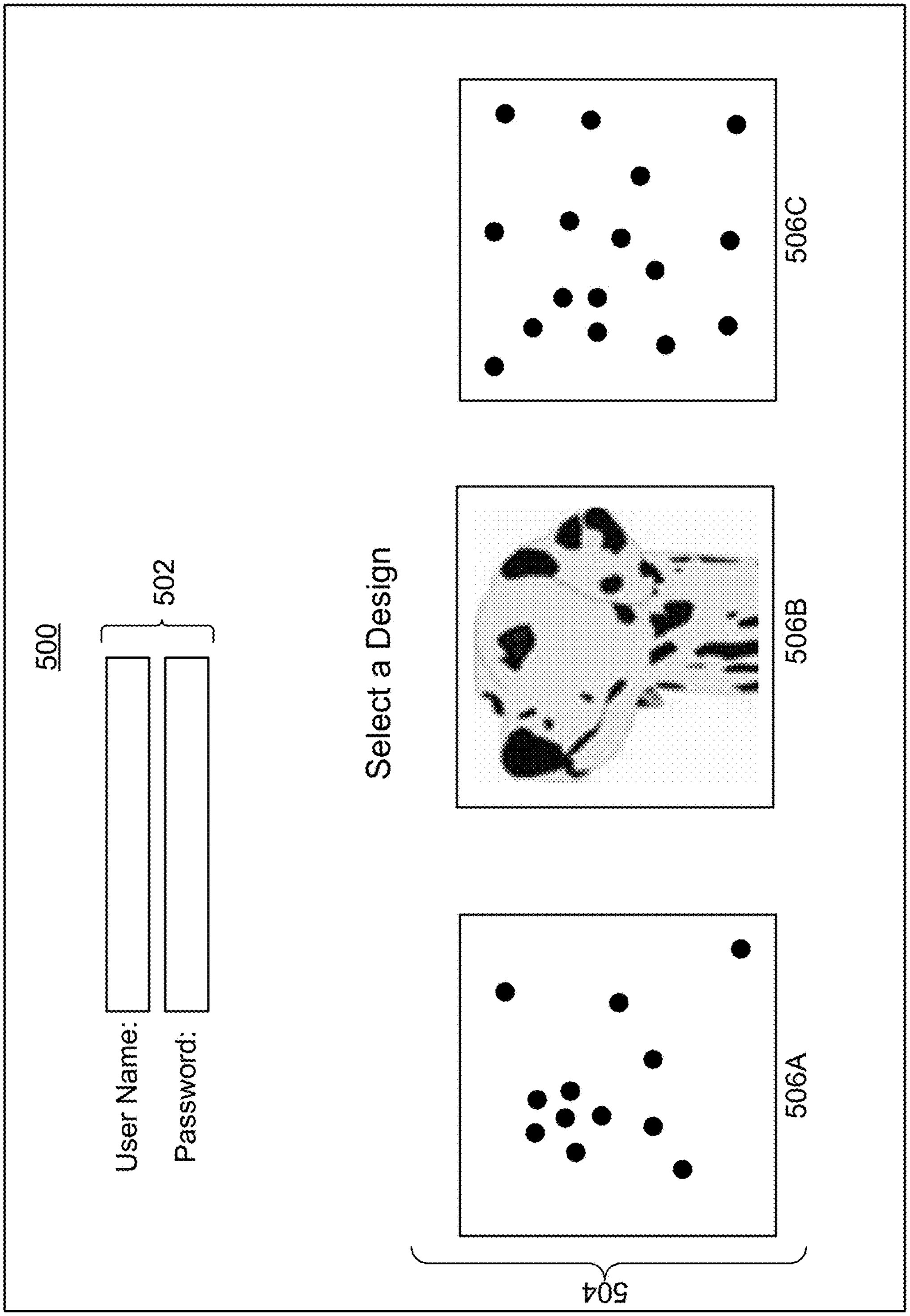
FIG. 5 illustrates an example user interface for selecting an ornamental design for a substrate.

FIG. 5 illustrates an example user interface (UI) for selecting an ornamental design for a substrate. A UI 500 for selecting an ornamental design for a substrate may be implemented as web page. As illustrated in the example of FIG. 5, UI 500 may include one or more areas 502 for a user to provide information identifying the user. In particular embodiments, information identifying the user may include a user name (e.g., an e-mail address) and a password. As an example and not by way of limitation, the input provided by the user may identify the user to a social-networking system. As described below, ornamental designs 506A-C may be based on social-graph information or input provided by the user. The social-graph information of the user may be directly entered by the user for this purpose, directly approved by the user for this purpose, or a privacy setting was opted into where this manufacturing process can access this type of information. In particular embodiments, UI 500 may display a window asking the user to opt-in to allow the computing system to access social-graph information of the user stored on a social-networking system. In response to the input of the user providing permission for the computing system to access this information, an ornamental-design panel 504 suggesting possible ornamental designs 506A-C for a substrate for the user to select may be displayed in UI 500. As an example and not by way of limitation, ornamental designs 506A-C is represented by a thumbnail image. As another example, personalized ornamental pattern 506C may be a pseudo-random speckle pattern generated using social-graph information of the user as a basis for one or more parameters of personalized ornamental pattern 506C. Although this disclosure illustrates and describes a particular user interface for selecting personalized ornamental patterns, this disclosure contemplates any suitable user interface for selecting personalized ornamental pattern.

In particular embodiments, a substrate may be personalized using any of the large-scale, in-line manufacturing processes described above. As example and not by way of limitation, personalized ornamental pattern 506A may be a speckle pattern that corresponds to galaxy constellation or star map based on information either directly entered by the user for this purpose, directly approved by the user for this purpose, or that a privacy setting was opted into where this process can access this type of information. As illustrated example of FIG. 5, personalized ornamental pattern 506B may be a pattern that corresponds to an image that is unique to the user (e.g., a pet owned by the user, where the image may be obtained from the social-graph (e.g., content node connected to the user) that have enabled privacy settings for sharing to this process. In particular embodiments, personalized ornamental pattern 506C may be a pseudo-random pattern that is generated using a parameter (e.g., seed number) obtained using social-graph information (e.g., number of connections) of the user either directly entered by the user for this purpose, directly approved by the user for this purpose, or that a privacy setting was opted into where this process can access this type of information. In particular embodiments, the ornamental pattern may combine the pseudo-random pattern in a non-random way using information about a user's interests—for example, the computing device may generate a pseudo-random pattern to form a non-random design tied to a user's interest. As an example and not by way of limitation, the ornamental pattern may be a pseudo-random speckle pattern that forms an image of the logo of a sports team that the user follows. Although this disclosure illustrates and describes a particular user interface for selecting personalized ornamental patterns, this disclosure contemplates any suitable user interface for selecting personalized ornamental pattern.

Examples of social-graph information that may be used as the basis for one or more parameters of a personalized ornamental pattern include user interests, as well as information derived from the social-graph (e.g., a number of friends, number of content objects or extracted objects from photos, content (e.g., extracted images or text) of content objects, pages or posts the user has liked/commented/shared on, or number of nodes or edges of the social graph within a threshold degree of separation from the node corresponding to the user). The social-graph information of the user may be directly entered by the user for this purpose, directly approved by the user for this purpose, or a privacy setting was opted into where this manufacturing process can access this type of information. As an example and not by way of limitation, any of the ornamental patterns described herein may be transferred to a front cover of a virtual reality/augmented reality headset, a surface of a smartphone, laptop computer, tablet computer, or any suitable computing device.

Figure 6:
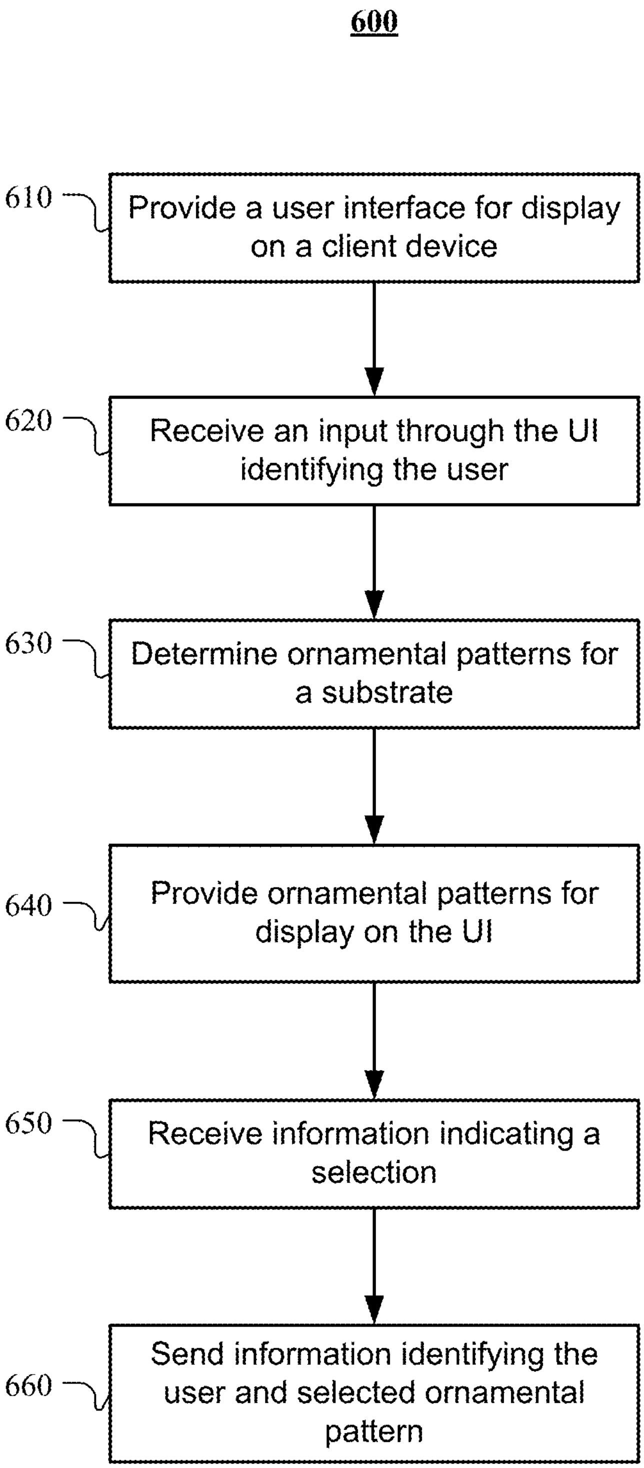
FIG. 6 illustrates an example method for presenting ornamental patterns on a user interface.

FIG. 6 illustrates an example method for presenting ornamental patterns on a user interface. The method 600 may begin at step 610, where a computing device provides a user interface (UI) for display on a client device of a user. At step 620, a computing device receives an input through the UI identifying the user. In particular embodiments, the input from the user may identify the user to a social-networking system. The ornamental pattern is personalized and specific to a particular user. At step 630, a computing device determines one or more ornamental patterns for a substrate based at least in part on data social-graph information or the input from the user. As described above, one or more parameters of the ornamental pattern may be based at least in part on social-graph information of the user. The social-graph information of the user may be directly entered by the user for this purpose, directly approved by the user for this purpose, or a privacy setting was opted into where this manufacturing process can access this type of information. As described above, the computing device may generate a pseudo-random pattern to form a non-random design tied to a user's content objects (e.g., photos or posts). As an example and not by way of limitation, the ornamental pattern may be a pseudo-random speckle pattern that forms an image of a pet of the user that was extracted from photos of the user. At step 640, a computing device provides one or more of the ornamental patterns for display on the UI. At step 650, a computing device receives information indicating a selection of one of the ornamental patterns. At step 660, a computing device sends information identifying the user and the selected ornamental pattern to a manufacturing facility. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for presenting ornamental patterns on a user interface including the particular steps of the method of FIG. 6, this disclosure contemplates any suitable method for presenting ornamental patterns on a user interface including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
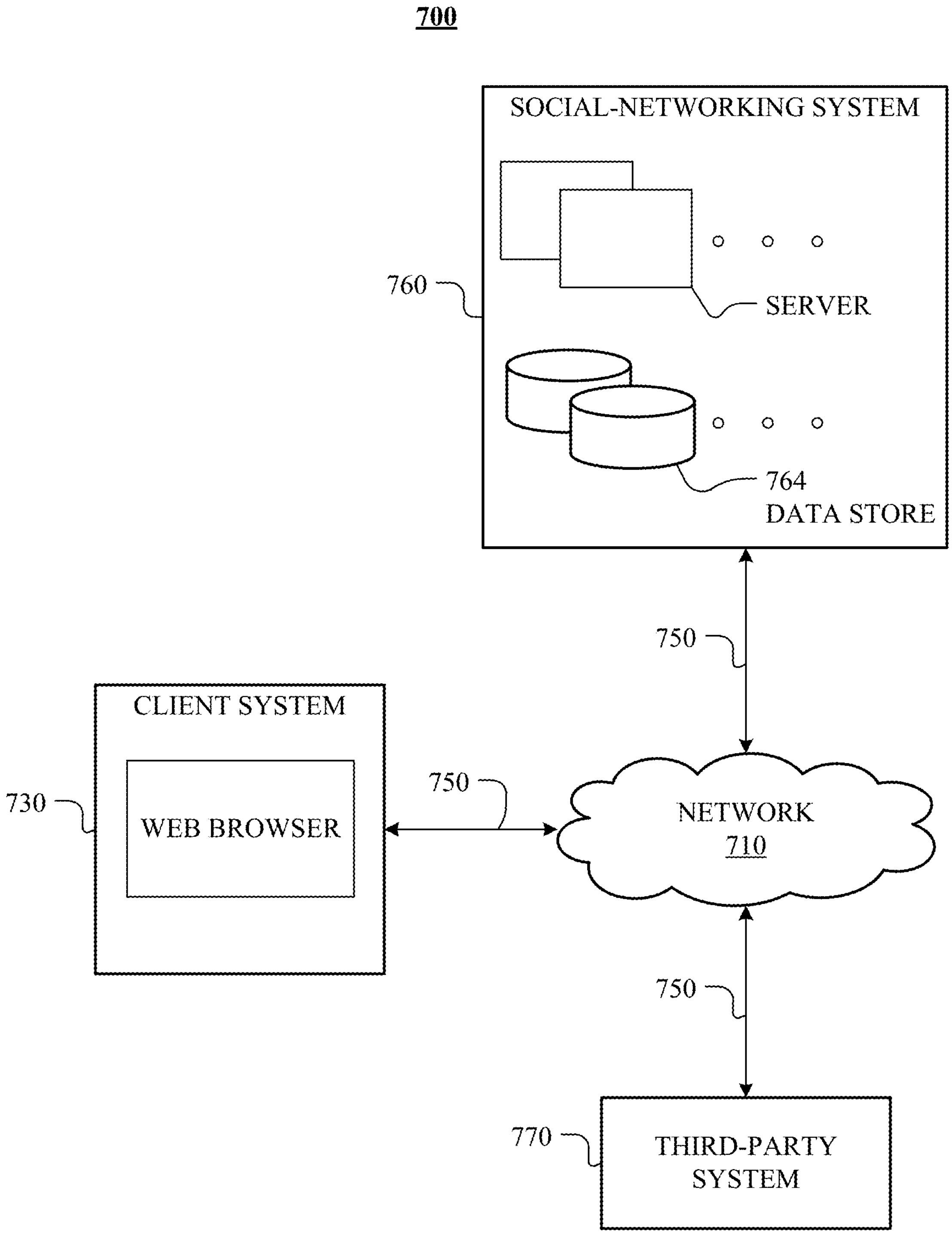
FIG. 7 illustrates an example network environment associated with a social-networking system.

FIG. 7 illustrates an example network environment associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

Figure 8:
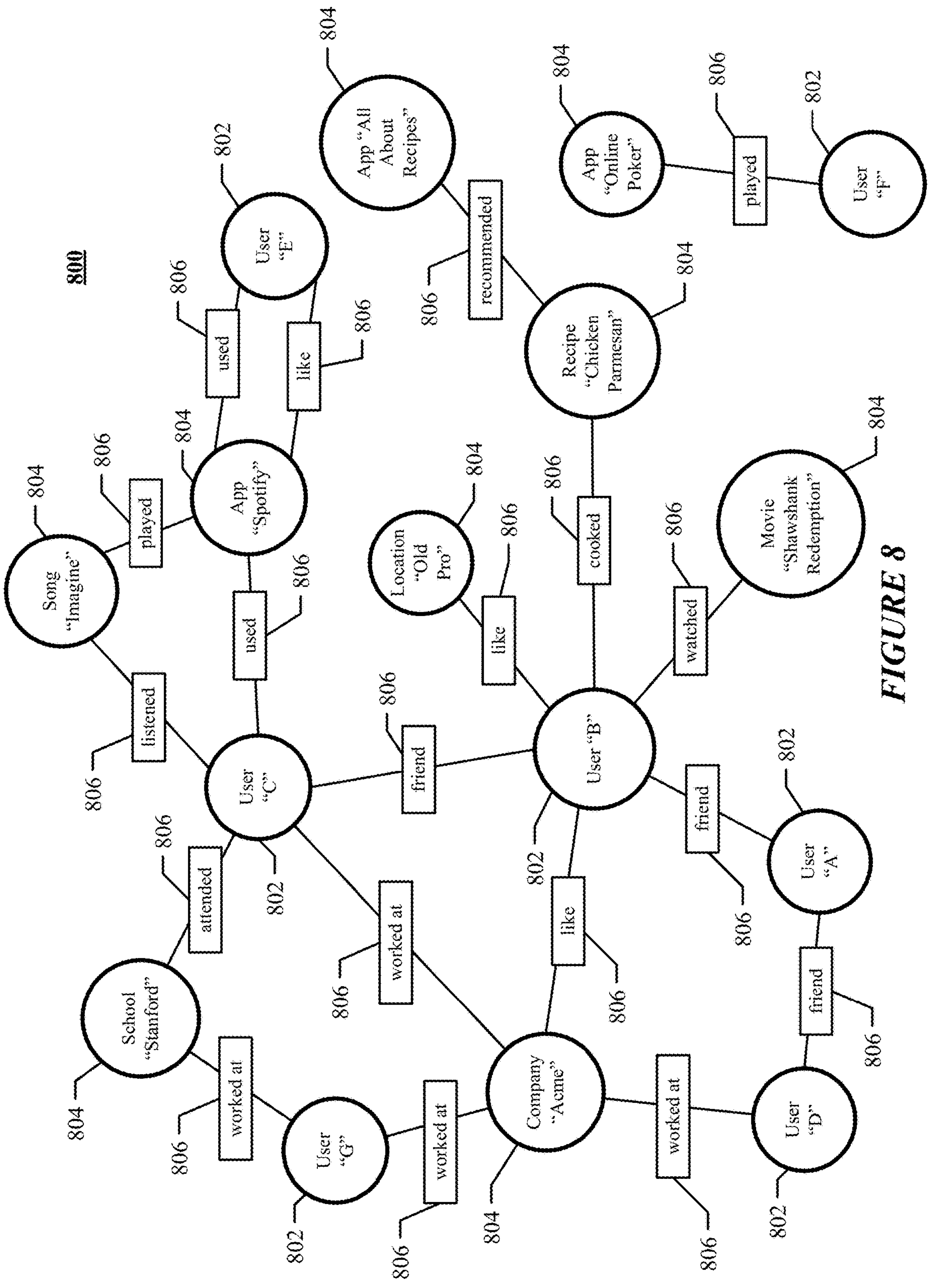
FIG. 8 illustrates an example social graph.

FIG. 8 illustrates an example social graph. In particular embodiments, the social-networking system 760 may store one or more social graphs 800 in one or more data stores. In particular embodiments, the social graph 800 may include multiple nodes—which may include multiple user nodes 802 or multiple concept nodes 804—and multiple edges 806 connecting the nodes. Each node may be associated with a unique entity (i.e., user or concept), each of which may have a unique identifier (ID), such as a unique number or username. The example social graph 800 illustrated in FIG. 8 is shown, for didactic purposes, in a two-dimensional visual map representation. In particular embodiments, a social-networking system 760, a client system 730, or a third-party system 770 may access the social graph 800 and related social-graph information for suitable applications. The nodes and edges of the social graph 800 may be stored as data objects, for example, in a data store (such as a social-graph database). Such a data store may include one or more searchable or queryable indexes of nodes or edges of the social graph 800.

In particular embodiments, a user node 802 may correspond to a user of the social-networking system 760. As an example and not by way of limitation, a user may be an individual (human user), an entity (e.g., an enterprise, business, or third-party application), or a group (e.g., of individuals or entities) that interacts or communicates with or over the social-networking system 760. In particular embodiments, when a user registers for an account with the social-networking system 760, the social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with the social-networking system 760. In particular embodiments, a user node 802 may be associated with information provided by a user or information gathered by various systems, including the social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more web interfaces.

In particular embodiments, a concept node 804 may correspond to a concept. As an example and not by way of limitation, a concept may correspond to a place (such as, for example, a movie theater, restaurant, landmark, or city); a website (such as, for example, a website associated with the social-networking system 760 or a third-party website associated with a web-application server); an entity (such as, for example, a person, business, group, sports team, or celebrity); a resource (such as, for example, an audio file, video file, digital photo, text file, structured document, or application) which may be located within the social-networking system 760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including the social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more web interfaces.

In particular embodiments, a node in the social graph 800 may represent or be represented by a web interface (which may be referred to as a "profile interface"). Profile interfaces may be hosted by or accessible to the social-networking system 760. Profile interfaces may also be hosted on third-party websites associated with a third-party system 770. As an example and not by way of limitation, a profile interface corresponding to a particular external web interface may be the particular external web interface and the profile interface may correspond to a particular concept node 804. Profile interfaces may be viewable by all or a selected subset of other users. As an example and not by way of limitation, a user node 802 may have a corresponding user-profile interface in which the corresponding user may add content, make declarations, or otherwise express himself or herself. As another example and not by way of limitation, a concept node 804 may have a corresponding concept-profile interface in which one or more users may add content, make declarations, or express themselves, particularly in relation to the concept corresponding to concept node 804.

In particular embodiments, a concept node 804 may represent a third-party web interface or resource hosted by a third-party system 770. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 730 to send to the social-networking system 760 a message indicating the user's action. In response to the message, the social-networking system 760 may create an edge (e.g., a check-in-type edge) between a user node 802 corresponding to the user and a concept node 804 corresponding to the third-party web interface or resource and store edge 806 in one or more data stores.

In particular embodiments, a pair of nodes in the social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, the social-networking system 760 may send a "friend request" to the second user. If the second user confirms the "friend request," the social-networking system 760 may create an edge 806 connecting the first user's user node 802 to the second user's user node 802 in the social graph 800 and store edge 806 as social-graph information in one or more of data stores 764. In the example of FIG. 8, the social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 800 by one or more edges 806. The degree of separation between two objects represented by two nodes, respectively, is a count of edges in a shortest path connecting the two nodes in the social graph 800. As an example and not by way of limitation, in the social graph 800, the user node 802 of user "C" is connected to the user node 802 of user "A" via multiple paths including, for example, a first path directly passing through the user node 802 of user "B," a second path passing through the concept node 804 of company "Acme" and the user node 802 of user "D," and a third path passing through the user nodes 802 and concept nodes 804 representing school "Stanford," user "G," company "Acme," and user "D." User "C" and user "A" have a degree of separation of two because the shortest path connecting their corresponding nodes (i.e., the first path) includes two edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile interface corresponding to a concept node 804 may include, for example, a selectable "check in" icon (such as, for example, a clickable "check in" icon) or a selectable "add to favorites" icon. Similarly, after a user clicks these icons, the social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, the social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, the social-networking system 760 may create an edge 806 between a user node 802 and a concept node 804 in the social graph 800. As an example and not by way of limitation, a user viewing a concept-profile interface (such as, for example, by using a web browser or a special-purpose application hosted by the user's client system 730) may indicate that he or she likes the concept represented by the concept node 804 by clicking or selecting a "Like" icon, which may cause the user's client system 730 to send to the social-networking system 760 a message indicating the user's liking of the concept associated with the concept-profile interface. In response to the message, the social-networking system 760 may create an edge 806 between user node 802 associated with the user and concept node 804, as illustrated by "like" edge 806 between the user and concept node 804. In particular embodiments, the social-networking system 760 may store an edge 806 in one or more data stores. In particular embodiments, an edge 806 may be automatically formed by the social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, one or more objects (e.g., content or other types of objects) of a computing system may be associated with one or more privacy settings. The one or more objects may be stored on or otherwise associated with any suitable computing system or application, such as, for example, a social-networking system 760, a client system 730, a third-party system 770, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 804 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 760 or shared with other systems (e.g., a third-party system 770). Although this disclosure describes using particular privacy settings in a particular manner, this disclosure contemplates using any suitable privacy settings in any suitable manner.

In particular embodiments, privacy settings may be based on one or more nodes or edges of a social graph 800. A privacy setting may be specified for one or more edges 806 or edge-types of the social graph 800, or with respect to one or more nodes 802, 804 or node-types of the social graph 800. The privacy settings applied to a particular edge 806 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 760. The object may be associated with a concept node 804 connected to a user node 802 of the first user by an edge 806. The first user may specify privacy settings that apply to a particular edge 806 connecting to the concept node 804 of the object, or may specify privacy settings that apply to all edges 806 connecting to the concept node 804. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 760 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 760 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store 764, the social-networking system 760 may send a request to the data store 764 for the object. The request may identify the user associated with the request and the object may be sent only to the user (or a client system 730 of the user) if the authorization server determines that the user is authorized to access the object based on the privacy settings associated with the object. If the requesting user is not authorized to access the object, the authorization server may prevent the requested object from being retrieved from the data store 764 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 760, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 760 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 760 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 760 may access such information in order to provide a particular function or service to the first user, without the social-networking system 760 having access to that information for any other purposes. Before accessing, storing, or using such objects or information, the social-networking system 760 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 760.

In particular embodiments, a user may specify whether particular types of objects or information associated with the first user may be accessed, stored, or used by the social-networking system 760. As an example and not by way of limitation, the first user may specify that images sent by the first user through the social-networking system 760 may not be stored by the social-networking system 760. As another example and not by way of limitation, a first user may specify that messages sent from the first user to a particular second user may not be stored by the social-networking system 760. As yet another example and not by way of limitation, a first user may specify that all objects sent via a particular application may be saved by the social-networking system 760.

In particular embodiments, privacy settings may allow a first user to specify whether particular objects or information associated with the first user may be accessed from particular client systems 730 or third-party systems 770. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 760 may provide default privacy settings with respect to each device, system, or application, and/or the first user may be prompted to specify a particular privacy setting for each context. As an example and not by way of limitation, the first user may utilize a location-services feature of the social-networking system 760 to provide recommendations for restaurants or other places in proximity to the user. The first user's default privacy settings may specify that the social-networking system 760 may use location information provided from a client device 730 of the first user to provide the location-based services, but that the social-networking system 760 may not store the location information of the first user or provide it to any third-party system 770. The first user may then update the privacy settings to allow location information to be used by a third-party image-sharing application in order to geo-tag photos.

In particular embodiments, the social-networking system 760 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 760. The user's privacy settings may specify that such information may be used only for particular processes, such as authentication, and further specify that such information may not be shared with any third-party system 770 or used for other processes or applications associated with the social-networking system 760. As another example and not by way of limitation, the social-networking system 760 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 770 or used by other processes or applications associated with the social-networking system 760. As another example and not by way of limitation, the social-networking system 760 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 770 or used by other processes or applications associated with the social-networking system 760.

Figure 9:
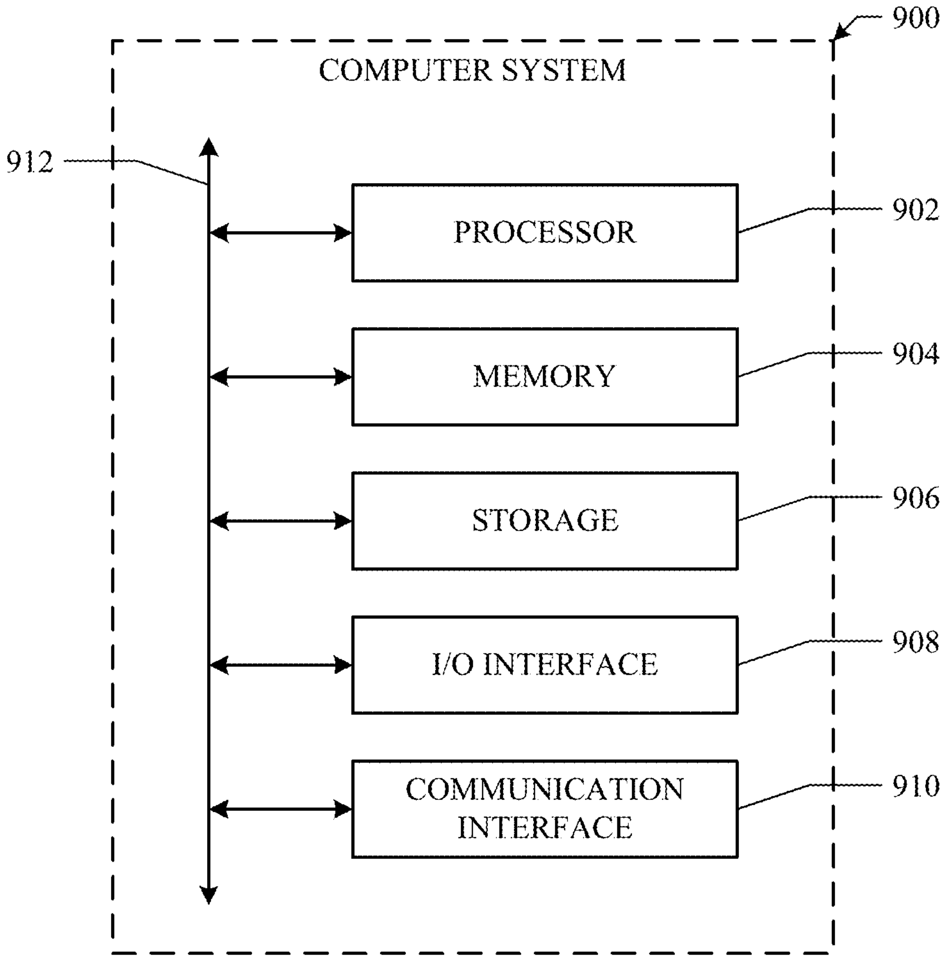
FIG. 9 illustrates an example computer system.

FIG. 9 illustrates an example computer system. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:

by one or more computing devices, determining an ornamental pattern to be transferred to a substrate, wherein:

the ornamental pattern is specific to a particular user; and one or more parameters of the ornamental pattern are based at least in part on social-graph information of the user;

by one or more computing devices, generating one or more instructions for controlling a laser-treatment system to transfer the ornamental pattern to the substrate;

by one or more computing devices, sending the instructions to the laser-treatment system to transfer the ornamental pattern to the substrate; and by the laser-treatment system, transferring the ornamental pattern to the substrate.

2. The method of claim 1, wherein the laser-treatment system is configured to transfer the ornamental pattern to the substrate by:

laser etching;

laser ablation; or laser lithography.

3. The method of claim 1, wherein the social-graph information comprises information stored on a social-graph on a social-networking system.

4. The method of claim 1, wherein transferring the ornamental pattern to the substrate further comprises anodizing, etching, coating, doping, depositing, or cladding a surface of the substrate.

5. The method of claim 1, wherein transferring the ornamental pattern to the substrate modifies a vertical profile of one or more portions of a surface of the substrate.

6. The method of claim 1, further comprising:

coating a surface of the substrate with an organic polymer sensitive to a wavelength of a laser of the laser-treatment system; and removing one or more portions of the organic polymer untreated by the laser.

7. The method of claim 1, wherein the transferred pattern comprises a cross-hatch or speckle pattern.

8. The method of claim 1, wherein the substrate comprises aluminum, stainless steel, magnesium, or plastic.

9. A substrate, prepared by a process comprising the steps of:

abrading a surface of a substrate;

transferring an ornamental pattern to the substrate by a laser-treatment system based on an ornamental pattern, wherein:

the ornamental pattern is specific to a particular user; and one or more parameters of the ornamental pattern are based at least in part on social-graph information of the user; and modifying a vertical profile of the surface based on areas of the surface of the substrate treated with the laser.

10. The substrate of claim 9, wherein the laser-treatment system is configured to treat the surface of the substrate by:

laser etching;

laser ablation; or laser lithography.

11. The substrate of claim 9, wherein the social-graph information comprises information stored on a social-graph on a social-networking system.

12. The substrate of claim 9, wherein modifying the vertical profile comprises anodizing, etching, coating, doping, depositing, or cladding the surface of the substrate.

13. The substrate of claim 9, wherein the process further comprises:

coating the surface of the substrate with an organic polymer sensitive to a wavelength of the laser; and removing one or more portions of the organic polymer untreated by the laser.

14. The substrate of claim 9, wherein the pattern comprises a cross-hatch or speckle pattern.

15. The substrate of claim 9, wherein the substrate comprises aluminum, stainless steel, magnesium, or plastic.

16. A method comprising:

by one or more computing devices, providing a user interface (UI) for display on a client device of a user;

by one or more computing devices, receiving an input through the UI identifying the user;

by one or more computing devices, determining one or more ornamental patterns for a substrate based at least in part on data social-graph information or the input from the user;

by one or more computing devices, providing one or more of the ornamental patterns for display on the UI;

by one or more computing devices, receiving information indicating a selection of one of the ornamental patterns; and by one or more computing devices, sending information identifying the user and the selected ornamental pattern to a manufacturing facility.

17. The method of claim 16, wherein the social-graph information comprises information stored on a social-graph on a social-networking system.

18. The method of claim 16, wherein the selected ornamental design is transferred to a face plate of a virtual reality/augmented reality headset, a surface of a smartphone, laptop computer, or tablet computer.

19. The method of claim 16, wherein one or more of the ornamental patterns is a pseudo-random pattern that is generated using a parameter obtained using social-graph information.

20. The method of claim 16, wherein one or more of the ornamental patterns is a speckle or cross-hatch pattern.

* * * * *